(12) United States Patent
Williams et al.

(10) Patent No.: US 6,766,070 B2
(45) Date of Patent: Jul. 20, 2004

(54) HIGH POWER FIBER OPTIC MODULATOR SYSTEM AND METHOD

(75) Inventors: Keith J. Williams, Owings, MD (US); Shane J. Strutz, Columbia, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 52 days.

(21) Appl. No.: 09/845,111

(22) Filed: Apr. 27, 2001

(65) Prior Publication Data

US 2002/0159668 A1 Oct. 31, 2002

(51) Int. Cl.$^7$ .............................................. G02F 1/035
(52) U.S. Cl. ............................................................ 385/3
(58) Field of Search ...................... 385/3, 2, 4, 8, 385/9, 14, 15, 16, 27, 31

(56) References Cited

U.S. PATENT DOCUMENTS

| | | | |
|---|---|---|---|
| 4,486,657 A | * 12/1984 | Bush ...................... | 250/227.19 |
| 4,703,287 A | 10/1987 | Fournier, Jr. et al. | |
| 5,193,128 A | * 3/1993 | Farina et al. ................... | 385/3 |
| 5,239,401 A | * 8/1993 | Olshansky ................... | 359/188 |
| 5,272,513 A | * 12/1993 | Vahala et al. ............... | 356/28.5 |
| 5,675,648 A | * 10/1997 | Townsend ................... | 380/278 |
| 5,699,179 A | 12/1997 | Gopalakrishnan | |
| 5,751,248 A | * 5/1998 | Thaniyavarn ............... | 342/368 |
| 6,072,919 A | 6/2000 | Dennis et al. | |
| 6,091,864 A | 7/2000 | Hofmeister | |
| 6,201,820 B1 | 3/2001 | Palmer | |
| 6,259,552 B1 | * 7/2001 | Boffi et al. .................. | 359/332 |
| 6,411,756 B2 | * 6/2002 | Sadot et al. ................... | 385/40 |
| 6,621,619 B2 | 9/2003 | Strutz et al. | |

FOREIGN PATENT DOCUMENTS

WO     WO 01/67552 A1     9/2001

OTHER PUBLICATIONS

Strutz, S.J. and Williams, K.J., Low–noise hybrid erbium/Brillouin amplifier; Electronics Letters, vol. 36, Issue: 16, Aug. 3, 2000, p. 1359–1360.

Strutz, S.J. and Williams, K.J., Esman, R.D., Polarization–maintaining hybrid erbium–Brillouin amplifier for high–power low–noise sources; IEE Photonics Technology Letters, vol. 13 Issue: 9, Sep. 2001, p. 936–38.

Strutz, S.J. and Williams, K.J., Esman, R.D., A high–power, low–noise polarization maintaining Erbium/Brillouin fiber amplified source; Optical Fiber Communication Conference and Exhibit, 2001, vol. 3, 2001, p. WA7–1–WA7–3.

"Broadband Application of High Impedance Ground Planes", Unclassified—ADA392025, Mar. 2001, 107 pages.

* cited by examiner

Primary Examiner—Frank G. Font
Assistant Examiner—Kevin C Kianni
(74) Attorney, Agent, or Firm—John J. Karasek; Sally A. Ferrett

(57) ABSTRACT

An apparatus and method to increase the output power from LiNbO3 MZM style optical intensity modulating without exceeding the optical power damage threshold imposed by LiNbO3 is described. The optical path from a laser source is divided into two paths by a polarization maintaining (PM) coupler. The two paths form a Mach Zender Modulator (MZM) with a LiNbO3 phase modulator in one path and a fiber looped PZT in the other. The LiNbO3 phase modulator imprints an RF signal onto one path of the MZM cavity, while the fiber wrapped PZT is used to control the path length difference between the two optical paths. The two optical paths are recombined in a second PM coupler. The second PM coupler and a 1–2% coupler are used to sample a small portion of the MZM output signal which is fed back to a phase locked loop (PLL) circuit for providing feedback voltage to the fiber wrapped PZT in the second arm of the MZM, and ensures the phase of the signals in the two arms of the MZM are matched to within a fraction of the laser linewidth. The present invention increases the amount of optical power by using a LiNbO3 modulator within a fiber Mach-Zender cavity.

34 Claims, 4 Drawing Sheets

HIGH POWER FIBER OPTIC MODULATOR SYSTEM AND METHOD

FIELD OF THE INVENTION

This invention relates to transmission and processing of electrical signals using an optical carrier. More particularly, it relates to a fiber optic modulator system for modulating high power optical carriers to increase the optical power from the modulator without exceeding the optical power damage threshold imposed by the modulator.

BACKGROUND AND SUMMARY OF THE INVENTION

The low loss and large intrinsic bandwidth of fiber-optic links make them invaluable for the transmission of information at RF frequencies. In most photonic links, the information is converted from RF signals to optical signals through the use of an external Mach-Zender modulator (MZM). Most electro-optic modulators (EOMs) are based on proton exchanged or Ti-interdiffused waveguides in $LiNbO_3$. When an electric field is applied across a waveguide, the optical path length of the waveguide is altered, allowing the phase of the output signal to be controlled. This effect is used to both alter the phase of the light (phase modulators) and to produce amplitude modulation when the waveguide is placed within an interferometer. However, there is a limitation on the amount of light that may be passed through a $LiNbO_3$ waveguide. This limitation is based on the photorefractive effect, which optically damages $LiNbO_3$. The material is not physically damaged, but the high optical fields cause charge migration in the $LiNbO_3$, which in turn alters the refractive index of the material, thus reducing the output. Typical values for the optical damage thresholds of Ti:$LiNbO_3$ and proton exchanged $LiNbO_3$ are approximately 10 $MW/cm^2$ and 40 $MW/cm^2$, respectively. These threshold levels limit the amount of optical power that may be inserted into a modulator to about 50–100 mW for Ti: $LiNbO_3$ modulators and to about 200–400 mW for proton exchange based $LiNbO_3$ modulators, depending upon the dimensions of the waveguide. Thus, there is a need to enhance the performance of fiber optic links by providing an intrinsic electronic gain, low noise, and higher optical power.

In one approach as illustrated in FIG. 1, a continuous wave optical signal from a source 12 is modulated by an electro-optic modulator (EOM) 16, which is preferably a LiNbO3 amplitude modulator (MZM), and detected by a high-frequency detector 18. The optical power transmitted through the MZM 16 is limited by its damage threshold, or by compression in the detector 18. Thus, there is a need to overcome the problems encountered by the prior art by improving the analog modulation of a continuous wave (CW) optical signal modulated by an MZM.

Accordingly, the present invention provides an apparatus and method to increase the output power from $LiNbO_3$ MZM style optical intensity modulators without exceeding the optical power damage threshold imposed by the modulator. In the exemplary embodiment of the present invention, the fiber optic modulator apparatus of the present invention includes: at least two polarization maintaining (PM) couplers, a piezoelectric transducer (PZT) cylinder, at least one phase modulator. Signals from an optical source are split into two paths by a PM coupler. The two paths form a Mach-Zender Modulator (MZM) with a $LiNbO_3$ phase modulator in one path and a fiber looped PZT in the other.

The $LiNbO_3$ phase modulator imprints an RF signal onto one path of the MZM cavity, while the fiber wrapped PZT is used to control the path length difference between the two MZM paths. The two optical paths are recombined in a second PM coupler. The second PM coupler and a 1–2% coupler (also referred to as fiber tap) are used to sample a small portion of the MZM output signal which is fed back to a phase locked loop (PLL) circuit for providing feedback voltage to the fiber wrapped PZT in the second arm of the MZM in order to ensure the phase of the signals in the two arms of the MZM are matched to within a fraction of the laser linewidth. The output power of the modulator is improved by using a $LiNbO_3$ modulator within a fiber Mach-Zender cavity.

In another embodiment, a polarization maintaining Erbium Doped Fiber Amplifier (EDFA) is inserted into the MZM cavity of the fiber optical link between the LiNbO3 phase modulator and the PM coupler of the first optical path.

In yet another embodiment, a second phase modulator is inserted into the second arm of the fiber MZM to allow for dual-drive modulation or adjustable-chirp modulation.

In one aspect, the present invention provides a fiber optic modulator system, comprising: an optical source; a first polarization maintaining (PM) coupler for splitting a signal received from the source into two optical paths, the two paths forming a Mach Zender Modulator (MZM); a phase modulator disposed in a first optical path; a piezo-electric transducer (PZT) disposed in a second optical path; a second PM coupler for recombining the first and second paths; and a detector for detecting the output of the MZM. The system of claim 1 further includes a fiber tap for sampling a portion of the MZM output; a d.c. photodetector for detecting the output of the fiber tap; and phase locked loop (PLL) for receiving a signal from said d.c. photodetector and providing a feedback signal to said PZT, thus allowing the relative phases of said first and second paths to be controlled. The PZT preferably controls the optical path length of the second optical path. The phase modulator is preferably of lithium niobate ($LiNbO_3$). The phase modulator is used to imprint an analog input signal into the first path, the analog input signal modulating a signal from the optical source. The phase modulator enables the phase of input signals to be modulated by an RF signal, the phase modulation is detected by the second PM coupler resulting in constructive and destructive interference. The phase modulator is preferably of the type that maintains the optical polarization of signals from the optical source which may be a diode pumped Nd:YAG ring cavity laser. The fiber modulator system further comprises a polarization maintaining erbium doped fiber amplifier disposed between the phase modulator and the second PM coupler, a second phase modulator disposed in said second path.

In another aspect, the present invention provides, in a fiber optic communication system having a plurality of fiber optic modulators and a plurality of fiber optic links, a method of enhancing the performance of fiber optic links comprising the steps of: providing an optical source; providing a first polarization maintaining (PM) coupler for splitting signals from the optical source into first and second paths, the first and second paths forming a Mach-Zender Modulator (MZM) cavity; disposing a phase modulator in the first path; disposing a piezo-electric transducer (PZT) in the second path; disposing a second PM coupler for combining the outputs of the phase modulator and the PZT; and detecting the output of the second PM coupler. The method further comprises providing a fiber tap for sampling a portion of the MZM output; providing a d.c. photodetector for detecting the output of the fiber tap; and providing a phase locked loop (PLL) for receiving a signal from said d.c. photodetector and providing a feedback signal to the PZT, thereby allowing the relative phases of the first and second paths to be controlled. The method further comprises the steps of imprinting an analog RF signal onto the first path using the phase modulator; and controlling the length of the second optical path using the PZT, and disposing a second phase modulator in the second path to allow for dual drive modulation. The output of the second PM coupler is detected using a plurality of high frequency photodetectors. The outputs of the high frequency photodetectors may be subtracted to implement a balanced photodetection scheme.

In another aspect, the present invention provides a fiber optic link system for transmitting signals from a source to a destination having a fiber optic modulator system, the fiber optic modulator system comprising: an optical source; a first phase modulator (PM) coupler for splitting a signal received from the source into two optical paths, said two paths forming a Mach Zender Modulator (MZM);a phase modulator disposed in a first optical path; a piezo-electric transducer (PZT) disposed in a second optical path; a second PM coupler for recombining the first and second paths; and a detector for detecting the output of the MZM according to various embodiments of the invention.

It will thus be seen that according to the present invention a high power fiber optic modulator is provided to overcome the problems faced by the prior art. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent methods and apparatus.

DETAILED DESCRIPTION OF THE INVENTION

Figure 1:
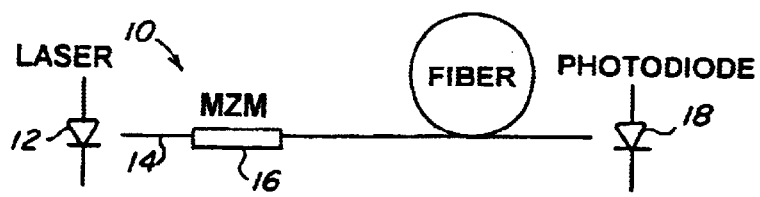
FIG. 1 illustrates a basic configuration of a conventional externally modulated optical link.
Figure 2:
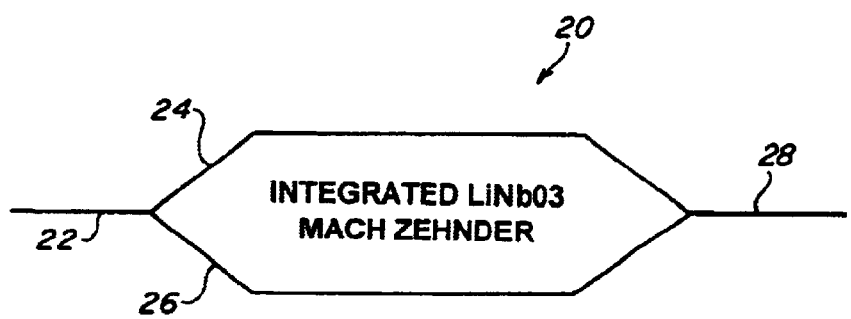
FIG. 2 illustrates an exemplary Y-branched Mach-Zender Modulator (MZM)
Figure 3:
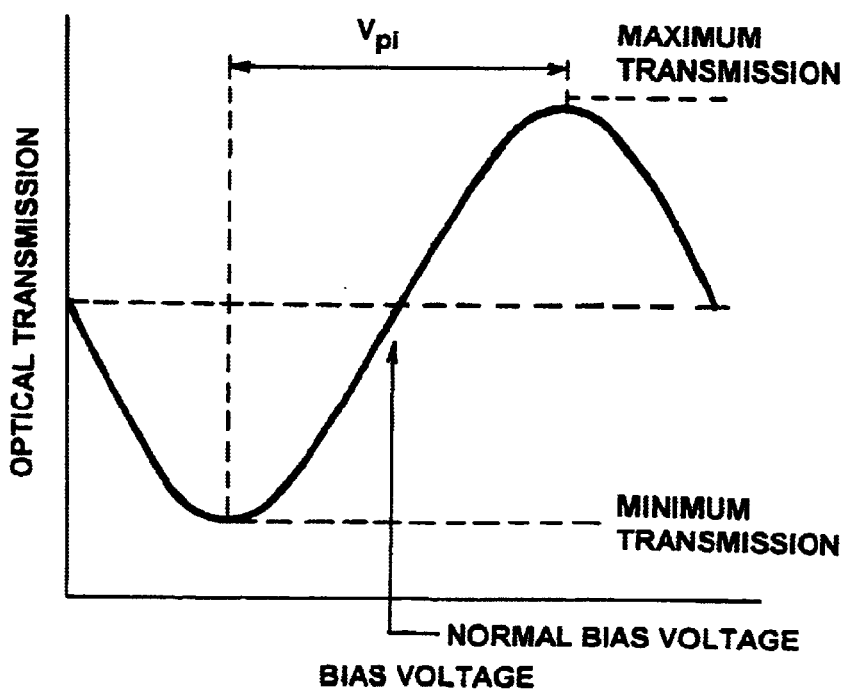
FIG. 3 depicts a graphical representation of Mach-Zender Modulator transmission versus bias voltage for the modulator of FIG. 2.

Referring now to FIG. 2, there is shown a method of transmitting information on an optical carrier. A continuous wave (CW) optical signal input at 22 into the MZM 20 is split at the input Y-branch of MZM or modulator 20. The two parallel optical waveguide arms 24, 26 form two phase modulators operating in a push-pull manner. The phase modulation is made possible due to the eletro-optic properties of the LiNbO$_3$ material used for the modulator. Optical signals from the upper waveguide path 24 and lower waveguide path 26 are recombined at the output Y-branch 28. If the optical beams from the two paths 24, 26 arrive in phase, light will be guided out of the MZM 20, and vice-versa. Thus, MZM 20 can be used to produce a transmission loss depending upon the electric bias applied to MZM 20. The optical output 28 from MZM 20 is dependant on the input electrical signal as illustrated in FIG. 3. The overall performance of MZM 20 is characterized by the switching voltage $V_{pi}$, which is the difference in bias voltages at the minimum and maximum transmission points as illustrated in FIG. 3. For example, to maintain linearity and achieve maximum differential change in optical output signal per unit volt, MZM 20 is typically biased at a point where the output is one-half of the maximum output signal. The bias point is generally referred to as "quadrature". When MZM 20 is biased at quadrature level, the optical output signal $P_{out}$ of MZM 20 is given by:

$$P_{out}=(P_{in}/2)[1\pm\sin(kx)]+P_{min} \quad (1)$$

where $P_{in}$ is the input optical power; k=constant, x=input signal voltage; $P_{min}$=minimum optical transmission of the modulator, and the sign (±) depends on the slope of the quadrature point chosen.

Figure 4:
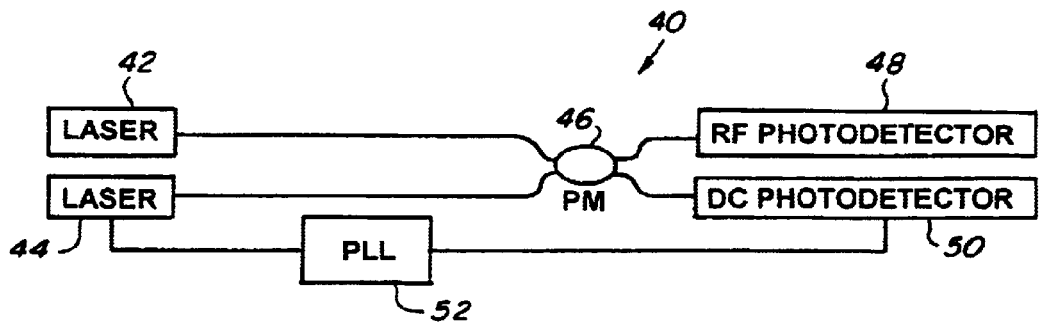
FIG. 4 illustrates an exemplary optical phase-locking system of the present invention.

Referring now to FIG. 4, there is shown an example arrangement of using an optical phase locking system 40 for the present invention. The wavelength of lasers 42, 44 may be varied by changing the laser crystal temperature, or by applying a voltage to a PZT bonded to a respective laser cavity. The outputs from the two lasers 42, 44 are combined in a PM coupler 46 the outputs of which lead to an RF photodetector 48 and a d.c. photodetector 50. The output of photodetector 50 is fed to a phase-locked-loop PLL 52 which causes the frequency of the laser 44 (slave laser) to track the frequency of laser 42 (master laser). PLL 52 includes a phase detector for determining the phase difference between the master laser 42 and slave laser 44. Laser 44 preferably operates as a voltage controlled oscillator (VCO). Lasers 42, 44 are preferably Nd:YAG ring cavity lasers. The voltage dependent frequency response of laser 44 is directly proportional to the applied PZT voltage and is characterized by the equation:

$$\omega=K_o V \quad (2)$$

From the definition of frequency as the derivative of phase, equation (2) yields the change in phase of the slave laser 44 due to an applied voltage given by the equation:

$$\phi=\int K_{o\ V\ dt} \quad (3)$$

where $K_o$=proportionality constant in units of rads/volt-sec.

Figure 5:
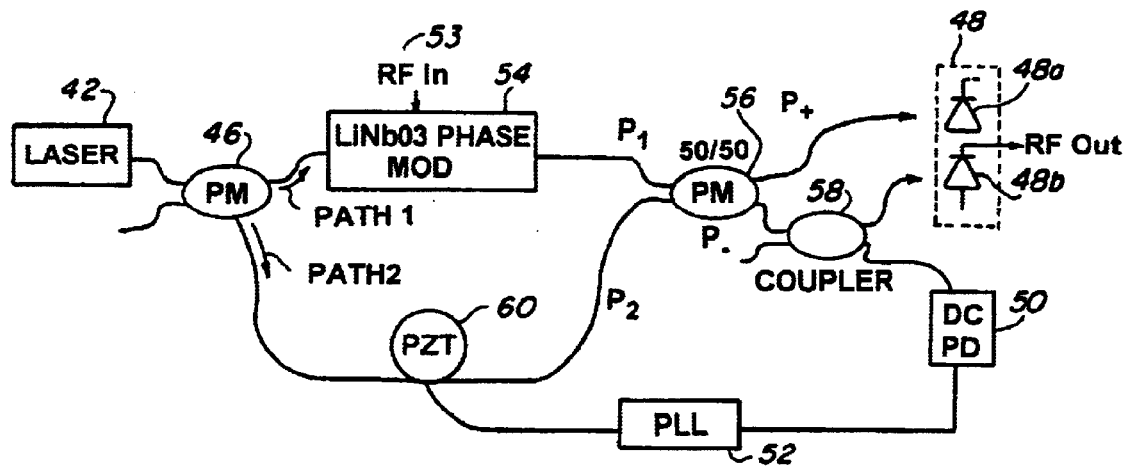
FIG. 5 illustrates schematic diagram of the fiber optic modulator system of the present invention.

Referring now to FIG. 5, there is shown at 51 a schematic diagram of the high power fiber optic modulator according to the present invention. The configuration of FIG. 5 is shown to generally comprise a laser 42, two PM couplers 46, 56, a PZT cylinder 60, a phase modulator 54, a 1–2% coupler 58, a d.c. photodetector 50, and a pair of high frequency RF photodetectors 48a, 48b. The optical path from the laser source 42 is split into two paths by PM coupler 46, the two paths form a MZM with a LiNbO$_3$ phase modulator 54 in one path (path 1) and a PZT 60 with optical fiber looped around it in the other path (path 2). The phase modulator 54 imprints an analog RF signal onto path 1 of the MZM cavity. The PZT 60 may be used to control the length of the optical path (path 2) in which it resides. The two optical paths (path 1 and path2) of the MZM cavity are recombined in the second PM coupler 56, the output of which is given by the equation:

$$P_\pm = \frac{1}{2}\{[P_1 + P_2 \pm 2 \times P1P2(\sin[(\omega_1 - \omega_2)t + \Phi_1 - \Phi_2)]\} \quad (4)$$

where $P_1$ and $P_2$ are the optical powers before PM coupler 56, and $P_+$ and $P_-$ designate the optical powers at the output of PM coupler 56. Signals $P_+$ and $P_-$ may be detected individually or by using a balanced detection scheme. The balanced detection scheme may be implemented by subtracting the outputs from the pair of RF photodetectors 48a, 48b, thus removing some of the noise from the RF output of the fiber optic link between the "RF In" 53 and "RF Out" 49. The resonant cavity of laser is designed to amplify optical signals of a desired frequency and attenuate signals of an undesired frequency. The cavity amplifies desired frequencies through use of a laser cavity dimensioned in one-quarter wavelength increments. The closer the cavity dimensions are to a desired tolerance, the narrower the range of frequencies within which the laser will operate, generally referred to as "linewidth". The narrower the linewidth, the less inherent amplitude and/or phase noise will be transmitted in a laser signal. Further, the narrower the linewidth, the more power is focused into a desired center frequency. In order for the light in the two optical paths (path 1, path 2) of the fiber optic modulator 51 to interfere with low noise, their respective path lengths must be matched to within a fraction of the laser linewidth. A small portion of the MZM output is sampled with a fiber tap (1–2% coupler) 58 the output of which is detected by d.c. photodetector 50 and fed to a PLL circuit 52 for providing a feedback voltage to the PZT 60 in the MZM cavity, thus allowing the relative phases of path 1 and path 2 to be controlled. When the fiber optic modulator 51 is phase locked, PLL 52 keeps the fiber-MZM in quadrature. An RF signal 53 applied to the LiNbO$_3$ modulator 54 in the fiber-MZM modulates the phase incident to PM coupler 56. If the RF frequency is above the close-loop frequency response of the PLL 52, the PLL 52 fails to track the signal. Thus, the amplitude of the light signal to the RF photodiodes of detectors 48a, 48b varies around the quadrature point as shown in FIG. 3.

Figure 6:
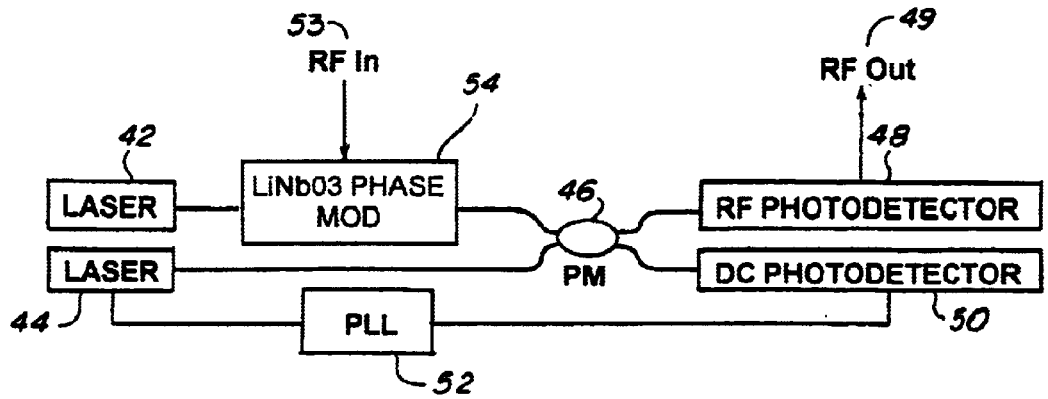
FIG. 6 illustrates a schematic diagram of an exemplary experimental configuration used to test the fiber optic modulator of FIG. 5.

Referring now to FIG. 6, there is shown a schematic diagram illustrating the experimental configuration used to test the present invention as shown in FIG. 5. The operation of FIG. 6 being similar to the operation of FIG. 4 of the present invention as discussed above. Once the lasers 42, 44 are phase-locked, the phase modulator 54 inserted between the master laser 42 and the PM coupler 46 enables the phase of the light in its path to be modulated with an RF signal 53. The phase modulation is detected by the PM coupler 46 resulting in constructive and destructive interference. The resulting amplitude modulation is detected by the RF detector 48.

Figure 7:
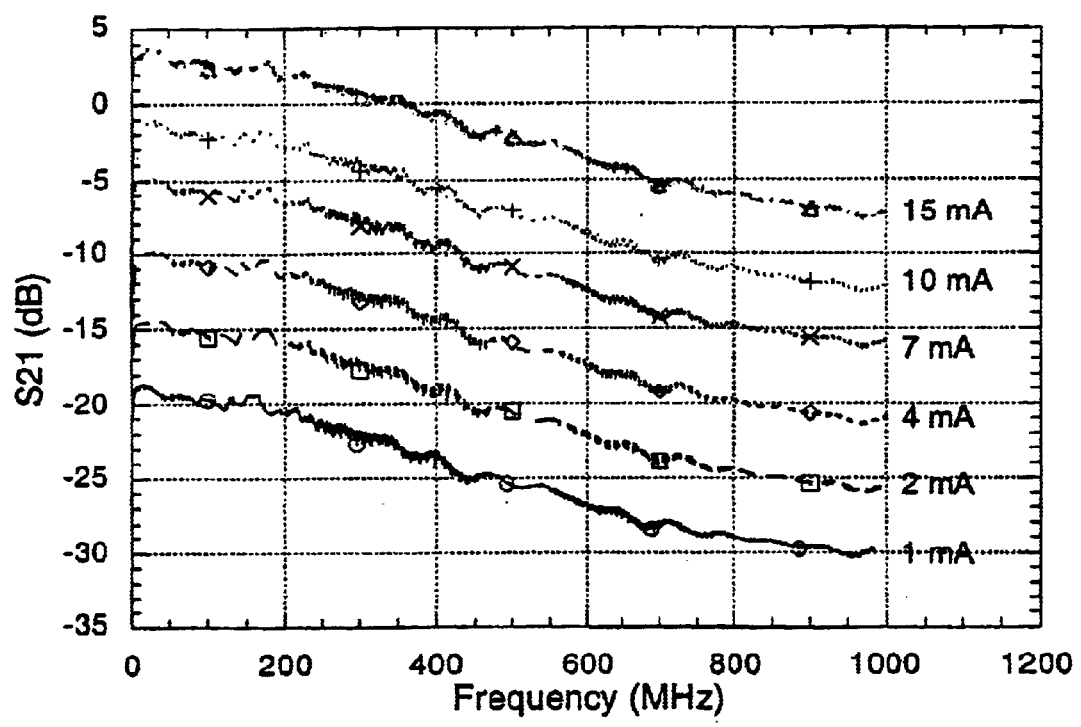
FIG. 7 shows a graphical plot of the MZM frequency response data for schematic of FIG. 6.

To experimentally verify the functionality of the phase-locked MZM of the present invention as illustrated in FIG. 6, the RF response of the system was measured from "RF In" 53 to "RF Out" 49 for various RF detector currents with the results plotted as illustrated in FIG. 7. The six measurements are labeled with the detector current used during the data acquisition process. The transmission of RF power through the optical link from RF In 53 port of the phase modulator 54 to the RF Out 49 of the photodetector 48 increases with detector current. Further, the 15 mA trace shows the added benefit of optical gain. Thus, using a high current RF photodetector(s) would drastically increase the net gain of the optical link—a desirable feature for both telecommunications and optical remoting applications. As depicted in FIG. 7, the link gain at 15 mA occurs at frequencies up to 300 MHz. Thus, replacing the phase modulator with a higher frequency modulator should increase the gain bandwidth of the optical link from MHz to GHz an obvious advantage.

Figure 8:
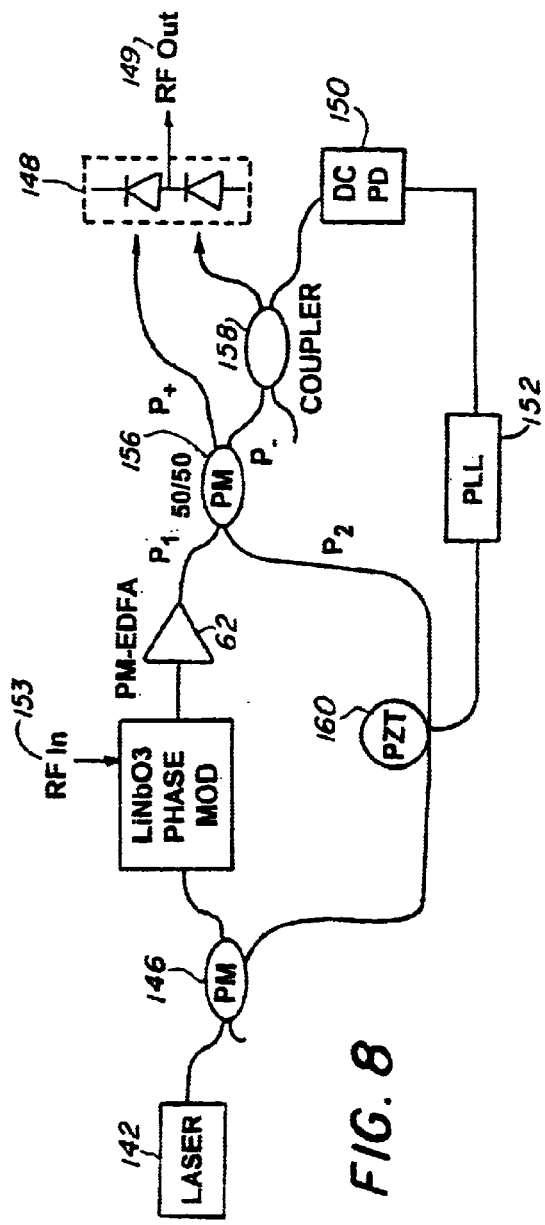
FIG. 8 illustrates another embodiment of the present invention with a PM-EDFA inserted in the MZM cavity of the fiber optic modulator of FIG. 5.

Referring now to FIG. 8, another embodiment of the invention is illustrated where elements in common with fiber optic modulator system of FIG. 5 are indicated by similar reference numerals, but with a prefix "1" added. Here, a polarization maintaining Erbium Doped Fiber Amplifier (PM-EDFA) may be inserted into the MZM cavity of the fiber optic link. The EDFA 62 is inserted in the MZM cavity between LiNbO$_3$ phase modulator 154 and the PM coupler 156, thus allowing the relatively small output of the phase modulator 154 to be increased, thus increasing the output power of the fiber optic modulator of the present invention. Further, since the EDFA 62 is placed before the output of PM coupler 156, the noise factor is lower than that of the fiber optic link discussed in FIG. 4. The spontaneous-spontaneous (sp-sp) beat frequencies produced by the EDFA 162 are distributed equally between the two outputs of the MZM cavity. Ability to achieve increased power while reducing the noise performance of the optical link makes the present invention attractive for high performance applications.

Figure 9:
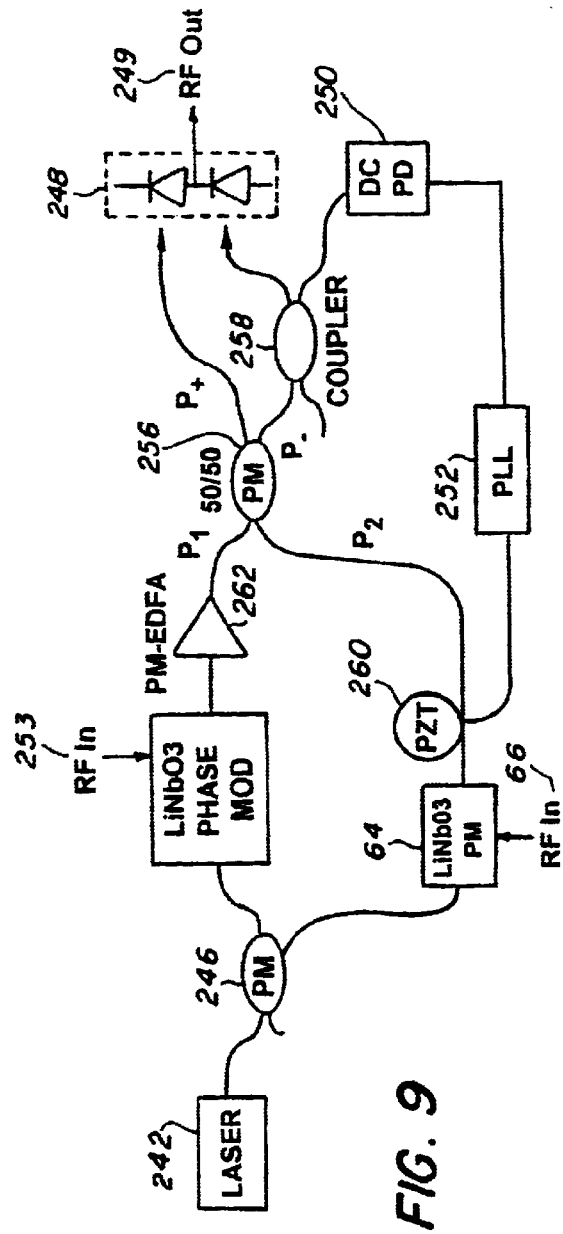
FIG. 9 illustrates another embodiment of the present invention with a second phase modulator inserted into the second arm (path2) of the fiber optic modulator of FIG. 5.

Referring now to FIG. 9, yet another embodiment of the present invention is illustrated where elements in common with fiber optic modulator system of FIG. 5 are indicated by similar reference numerals, but with a prefix "2" added. Here, a second phase modulator 64 is inserted into the second arm (path 2) of the fiber Mach-Zender optical link to allow for dual-drive modulation or adjustable-chirp modulation.

While specific positions for various components comprising the invention are given above, it should be understood that those are only indicative of the relative positions most likely needed to achieve a desired power with reduced noise margins. It will be appreciated that the indicated positions are exemplary, and several other components may be added or subtracted while not deviating from the spirit and scope of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fiber optic modulator system, comprising:

an optical source;

a first polarization maintaining (PM) coupler for splitting a signal received from said source into a first optical path and a second optical path, said first optical path and said second optical path forming a Mach Zender Modulator (MZM);

a phase modulator disposed in the first optical path;

a piezo-electric transducer (PZT) disposed in the second optical path;

a second PM coupler for recombining said first and second optical paths;

an amplifier disposed between the phase modulator and the second PM coupler for amplifying a signal from the phase modulator; and a detector for detecting the output from said second PM coupler.

2. The system of claim 1 further comprising:

a fiber tap for sampling output from the second PM coupler;

a d.c. photodetector for detecting the output of said fiber tap; and a phase locked loop (PLL) system disposed to receive a signal from said d.c. photodetector, said PLL system providing a feedback signal to said PZT for controlling the relative phases of said first and second optical paths.

3. The system of claim 2 wherein said PZT controls the optical path length of said second optical path.

4. The system of claim 2 wherein said phase modulator comprises lithium niobate (LiNbO$_3$).

5. The system of claim 4 wherein said phase modulator imprints an analog signal into said first optical path for modulating a signal from said optical source.

6. The system of claim 5 wherein said phase modulator enables phase modulation of signals in said first optical path by an RF signal, the phase modulation being detected by said second PM coupler.

7. The system of claim 6 wherein said phase modulator maintains optical polarization of signals from said optical source.

8. The system of claim 7 wherein said optical source is a diode pumped Nd:YAG ring cavity laser.

9. The system of claim 2 further comprising:

a second phase modulator disposed in said second path.

10. The system of claim 1 wherein the amplifier is an erbium doped fiber amplifier.

11. A fiber optic communication system comprising:

a transmitter having a fiber optical modulator system according to claim 1, a receiver; and a communication link for transmission of signals from the transmitter to the receiver.

12. The system according to claim 11, wherein the amplifier is an erbium-doped fiber amplifier.

13. A fiber optic communication system having:

a fiber optic modulator system according to claim 1, the fiber optical modulator system further including a phase locked loop (PLL) for providing feedback to the PZT to control relative phases of the first and second optical paths.

14. The system according to claim 13, wherein the amplifier is an erbium-doped fiber amplifier.

15. In a fiber optic communication system having at least one fiber optic modulator, a method of enhancing the performance of the communication system comprising:

providing an optical source;

splitting signals from said optical source into first and second optical paths, said first and second optical paths forming a Mach-Zender Modulator (MZM) cavity;

phase modulating the signals in said first optical path;

amplifying the phase modulated signal in the first optical path;

controlling an optical path length of said second optical path;

combining the amplified signal in said first optical path with the signal in the second optical path; and detecting the combined signals.

16. The method of claim 15 further comprising:

sampling the combined signals;

detecting the sampled signals; and controlling the relative phases of said first and second paths.

17. The method of claim 15 wherein said phase modulator comprises lithium niobate (LiNbO3).

18. The system of claim 15 wherein a LiNbO$_3$ modulator modulates the signals in said first optical path.

19. The method of claim 15 further comprising:

inputting an analog signal to control the modulation of signals in said first path.

20. The method of claim 15 further comprising:

imprinting an analog RF signal onto said first path.

21. The method of claim 15 further comprising:

modulating the signal in the second optical path with a second phase modulator disposed in said second path.

22. The method of claim 15 wherein the output of said second PM coupler is detected using a plurality of photodetectors.

23. The method of claim 22 wherein the outputs of said photodetectors are subtracted to implement a balanced detection scheme.

24. A method according to claim 15, wherein amplifying the phase modulated signal in the first optical path includes passing a signal from the phase modulator through an erbium doped fiber amplifier.

25. A method according to claim 15, the optical source transmitting an optical signal to the optical coupler, the optical signal transmitted to the optical coupler having an optical power level greater than a threshold breakdown level of the phase modulator.

26. A method according to claim 25, wherein the phase modulator is a lithium niobate phase modulator.

27. A fiber optic link system for transmitting signals from a source to a destination having a fiber optic modulator, the fiber optic modulator comprising:

an optical source;

a first polarization maintaining (PM) coupler for splitting a signal received from said source into two optical paths including a first optical path and a second optical path, said first and second optical paths forming a Mach Zender Modulator (MZM);

a phase modulator disposed in the first optical path;

a piezo-electric transducer (PZT) disposed in the second optical path;

a second PM coupler for recombining said first and second paths;

an amplifier disposed in the first optical path between the phase modulator and the second PM coupler for amplifying a phase modulated signal in the first optical path; and a detector for detecting the output of said second coupler.

28. The system of claim 27 further comprising:

a fiber tap for sampling a portion of the output of said second coupler;

a d.c. photodetector for detecting the output of said fiber tap; and a phase locked loop (PLL) for receiving a signal from said d.c. photodetector and providing a feedback signal to said PZT to control the relative phases of said first and second paths.

29. The system according to claim 27, wherein the amplifier is an erbium-doped fiber amplifier.

30. A fiber optic modulator system, comprising:
   an optical source;
   a first polarization maintaining (PM) coupler for splitting a signal received from the source into a first optical path and a second optical path, the first optical path and the second optical path forming a Mach Zender Modulator (MZM) cavity;
   a first phase modulator disposed in the first optical path;
   a piezo-electric transducer (PZT) and a second phase modulator disposed in the second optical path;
   a second PM coupler for recombining the first and second optical paths; and
   a detector for detecting the output from the second PM coupler.

31. In a fiber optic system having a first optical path and a second optical path, the first and second optical paths forming a Mach-Zender Modulator (MZM) cavity, at least one phase modulator being disposed in the first optical path, the phase modulator having at least one phase modulator having a threshold breakdown level, a method comprising:
   providing an optical signal to an optical coupler, the optical signal having an optical power level greater than the threshold breakdown level of the fiber optic modulator;
   the optical coupler splitting the optical signal into a first optical signal in the first optical path and a second optical signal In the second optical path;
   phase modulating the first optical signal with the fiber optic modulator;
   controlling an optical path length of the second optical path;
   combining the phase modulated first optical signal with the second optical signal; and
   detecting the combined signals.

32. A method for detecting an optical signal, the method comprising:
   providing an optical signal to a first polarization maintaining optical coupler;
   the first polarization maintaining optical coupler splitting the optical signal in a first optical path and a second optical signal in a second optical path, the first optical path and the second optical path forming a Mach Zehnder Modulator;
   phase modulating the first optical signal with a fiber optic modulator;
   controlling an optical path length of the second optical path with piezo-electric transducer disposed in the second optical path;
   combining the phase modulated first optical signal with the second optical signal in a second polarization maintaining optical coupler; amplifying the combined signals with an amplifier disposed between the phase modulator and the second polarization maintaining optical coupler; and
   detecting the amplified combined signals.

33. A method according to claim 32, wherein the optical signal provided to the optical coupler has an optical power level greater than a threshold breakdown level of the fiber optic modulator.

34. A method according to claim 32, further comprising:
   amplifying the phase modulated first optical signal before combining the phase modulated first optical signal with the second optical signal.

* * * * *

UNITED STATES PATENT AND TRADEMARK OFFICE
CERTIFICATE OF CORRECTION

PATENT NO.   : 6,766,070 B2
DATED        : July 20, 2004
INVENTOR(S)  : Keith J. Williams It is certified that error appears in the above-identified patent and that said Letters Patent is hereby corrected as shown below:

Title page,
Item [*] Notice, delete the phrase "by 52 days" and insert -- by 0 days --

Signed and Sealed this

First Day of March, 2005

JON W. DUDAS
*Director of the United States Patent and Trademark Office*